United States Patent [19]

Matsuda et al.

[11] Patent Number: 5,798,865
[45] Date of Patent: Aug. 25, 1998

[54] BEAM SPLITTER

[75] Inventors: Hiroaki Matsuda, Sapporo; Hideki Noda; Nobuhiro Fukushima, both of Kawasaki, all of Japan

[73] Assignee: Fujitsu Limited, Kawasaki, Japan

[21] Appl. No.: 831,341

[22] Filed: Mar. 31, 1997

Related U.S. Application Data

[62] Division of Ser. No. 556,771, Nov. 2, 1995, Pat. No. 5,661,602.

[30] Foreign Application Priority Data

Mar. 16, 1995 [JP] Japan .................................. 7-057154

[51] Int. Cl.$^6$ ........................................... G02B 1/10
[52] U.S. Cl. .................................. 359/583; 359/359
[58] Field of Search .............................. 359/359, 495, 359/498, 583, 589

[56] References Cited

U.S. PATENT DOCUMENTS

| 3,781,090 | 12/1973 | Sumita | 359/589 |
| 5,579,138 | 11/1996 | Sonnohe et al. | 359/583 |

FOREIGN PATENT DOCUMENTS

| 3-94202 | 4/1991 | Japan . |
| 5-215906 | 8/1993 | Japan . |
| 5-215917 | 8/1993 | Japan . |
| 6-82623 | 3/1994 | Japan . |

Primary Examiner—Paul M. Dzierzynski
Assistant Examiner—Darren E. Schuberg
Attorney, Agent, or Firm—Staas & Halsey

[57] ABSTRACT

A beam splitter formed by laminating a plurality of optical films on a glass substrate having a refractive index of 1.51±0.10. The optical films are first, second, third, fourth, and fifth layers laminated in this order from the glass substrate. The first layer has a refractive index of 1.44±0.10 and an optical film thickness of 0.05–0.15; the second layer has a refractive index of 1.68±0.10 and an optical film thickness of 0.01–0.10; the third layer has a refractive index of 1.44±0.10 and an optical film thickness of 0.50–0.60; the fourth layer has a refractive index of 2.23±0.10 and an optical film thickness of 0.25–0.35; and the fifth layer has a refractive index of 1.44±0.10 and an optical film thickness of 0.25–0.35. The optical film thickness means a relative value represented by $n \times d/\lambda$ where n denotes a refractive index; d denotes an actual film thickness, and $\lambda$ denotes a wavelength deciding the center of a wavelength band. The beam splitter can reduce the polarization dependency of a branching ratio with a beam incident angle of 22.5°.

2 Claims, 7 Drawing Sheets

BEAM SPLITTER

This application is a division of application Ser. No. 08/556,771, filed Nov. 2, 1995, now U.S. Pat. No. 5,661,602.

BACKGROUND OF THE INVENTION

1. Field of the Invention

The present invention relates to a beam splitter for use in a light amplification module or the like.

2. Description of the Related Art

In a light amplification module, for example, a part of signal light is taken out as monitor light by a beam splitter, and the power of the monitor light is detected. Then, the signal light is amplified according to fluctuations in the power of the monitor light. In such a beam splitter used, for example, to branch the monitor light from the signal light, it is desired to reduce polarization dependency such that a branching ratio in the beam splitter differs between P-polarized light and S-polarized light.

The beam splitter is used to branch a single light beam into two or more light beams. Conversely, the beam splitter is used also to couple two or more light beams into a single light beam. The beam splitter is configured by laminating a plurality of optical films formed of dielectric or the like on a glass substrate, and light is incident on the multilayered optical films and introduced to an optical axis with a predetermined beam incident angle set, thus functioning to reflect a part of the incident light on the multilayered optical films and transmit the remaining part. The term of beam incident angle means an angle defined between a line perpendicular to the multilayered optical films of the beam splitter and a beam of incident light. In a conventional beam splitter, the beam incident angle is set to 10° or less or 45°, and the polarization dependency of the branching ratio such that the branching ratio is different between P-polarized light and S-polarized light on the reflection side (i.e., the difference between reflected P-polarized light and reflected S-polarized light) is about 0.5 dB. The P-polarized light means polarized light having a plane of polarization parallel to a plane of incidence on the multilayered optical films, and the S-polarized light means polarized light having a plane of polarization perpendicular to the plane of incidence.

In many cases, the beam incident angle in a short wave pass filter (SWPF) or a long wave pass filter (LWPF) used in a light amplification module or the like is set to 22.5°. Accordingly, if the beam incident angle in the beam splitter used in the light amplification module or the like is set to 22.5°, the module can be designed with such an advantage that the optical placement of optical elements can be made simple. Further, the polarization dependency on the reflection side in the conventional beam splitter is about 0.5 dB which is a relatively large value. Accordingly, in the case where an LD (laser diode) for generating linearly polarized light is used as a light source, the branching ratio in the beam splitter changes according to a polarized condition of incident light, causing variations in characteristic of the beam splitter, which are disadvantageous in practical use.

SUMMARY OF THE INVENTION

It is therefore an object of the present invention to provide a beam splitter with the beam incident angle set to 22.5° and the polarization dependency of the branching ratio reduced.

In accordance with an aspect of the present invention, there is provided a beam splitter formed by laminating a plurality of optical films on a substrate, wherein:

said substrate comprises a glass substrate having a refractive index of 1.51±0.10; and said optical films comprise:

a first layer formed on said glass substrate, said first layer having a refractive index of 2.23±0.10 and an optical film thickness of 0.40–0.50;

a second layer formed on said first layer, said second layer having a refractive index of 1.44±0.10 and an optical film thickness of 0.40–0.50;

a third layer formed on said second layer, said third layer having a refractive index of 2.23±0.10 and an optical film thickness of 0.30–0.40;

a fourth layer formed on said third layer, said fourth layer having a refractive index of 1.44±0.10 and an optical film thickness of 0.10–0.20;

a fifth layer formed on said fourth layer, said fifth layer having a refractive index of 2.23±0.10 and an optical film thickness of 0.10–0.20;

a sixth layer formed on said fifth layer, said sixth layer having a refractive index of 1.44±0.10 and an optical film thickness of 0.10–0.20;

a seventh layer formed on said sixth layer, said seventh layer having a refractive index of 2.23±0.10 and an optical film thickness of 0.10–0.20;

an eighth layer formed on said seventh layer, said eighth layer having a refractive index of 1.44±0.10 and an optical film thickness of 0.20–0.30;

a ninth layer formed on said eighth layer, said ninth layer having a refractive index of 2.23±0.10 and an optical film thickness of 0.55–0.65;

a tenth layer formed on said ninth layer, said tenth layer having a refractive index of 1.44±0.10 and an optical film thickness of 0.40–0.50;

an eleventh layer formed on said tenth layer, said eleventh layer having a refractive index of 2.23±0.10 and an optical film thickness of 2.50–3.50; and a twelfth layer formed on said eleventh layer, said twelfth layer having a refractive index of 1.44±0.10 and an optical film thickness of 0.20–0.30.

The optical film thickness means a relative value represented by $n \times d/\lambda$ where n denotes a refractive index; d denotes an actual film thickness; and $\lambda$ denotes a wavelength which determines a center of wavelength band used.

The present inventors have proved that a beam splitter with the beam incident angle set to 22.5° and the polarization dependency of a branching ratio reduced to 0.1–0.2 dB or less on the reflection side can be realized by setting the refractive index of the glass substrate, the number of layers of the optical films, and the refractive index and the optical film thickness of each optical film as defined above. Accordingly, it is possible to realize a beam splitter with the beam incident angle set to 22.5° which is the same as that set in other optical components such as a short wave pass filter (SWPF) and a long wave pass filter (LWPF) used in a light amplification module or the like, thereby making easy the designing of the light amplification module or the like, e.g., making simple the optical placement of optical elements. Further, since the polarization dependency of the branching ratio is small, there is no possibility that the branching ratio in the beam splitter may change according to a polarized condition of incident light, thereby realizing a fixed characteristic.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
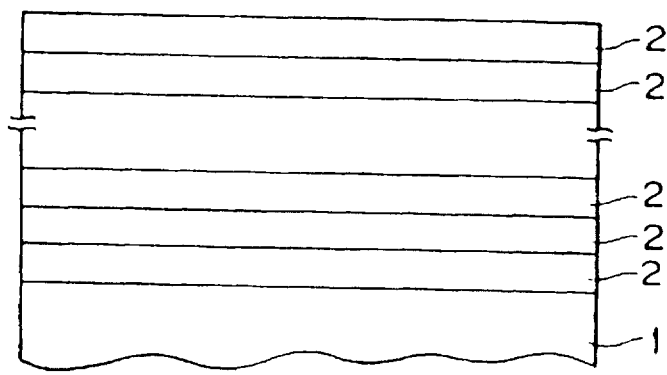
FIG. 1 is a view showing the basic configuration of a beam splitter according to the present invention.

Some preferred embodiments of the present invention will now be described with reference to the drawings. FIG. 1 is a view showing the basic configuration of a beam splitter according to the present invention. The beam splitter is configured by laminating a plurality of optical films 2 on a glass substrate 1. The material of each optical film 2 is so selected as to form a high-refractive index layer, a medium-refractive index layer, or a low-refractive index layer. Each optical film 2 is formed by sputtering, electron beam evaporation, etc. so as to have a predetermined thickness. In the following description, the term of optical film thickness means a relative index represented by $n \times d/\lambda$ where n denotes a refractive index; d denotes an actual film thickness; and $\lambda$ denotes a wavelength which determines a center of wavelength band used.

First Preferred Embodiment

In this preferred embodiment, the optical films 2 are totally twelve layers of the first layer to the twelfth layer, and they are configured by alternately laminating the high-refractive index layers and the low-refractive index layers on the glass substrate 1 as mentioned below. The refractive index of the glass substrate 1 and the refractive index and the optical film thickness of each optical film 2 are set as follows:

|  | Refractive Index | Optical Film Thickness |
|---|---|---|
| Substrate: | 1.51 ± 0.10 | — |
| First Layer: | 2.23 ± 0.10 | 0.40–0.50 |
| Second Layer: | 1.44 ± 0.10 | 0.40–0.50 |
| Third Layer: | 2.23 ± 0.10 | 0.30–0.40 |
| Fourth Layer: | 1.44 ± 0.10 | 0.10–0.20 |
| Fifth Layer: | 2.23 ± 0.10 | 0.10–0.20 |
| Sixth Layer: | 1.44 ± 0.10 | 0.10–0.20 |
| Seventh Layer: | 2.23 ± 0.10 | 0.10–0.20 |
| Eighth Layer | 1.44 ± 0.10 | 0.20–0.30 |
| Ninth Layer: | 2.23 ± 0.10 | 0.55–0.65 |

-continued

|  | Refractive Index | Optical Film Thickness |
|---|---|---|
| Tenth Layer: | 1.44 ± 0.10 | 0.40–0.50 |
| Eleventh Layer: | 2.23 ± 0.10 | 2.50–3.50 |
| Twelfth Layer: | 1.44 ± 0.10 | 0.20–0.30 |
| External Medium: | 1.00 | — |

Figure 2:
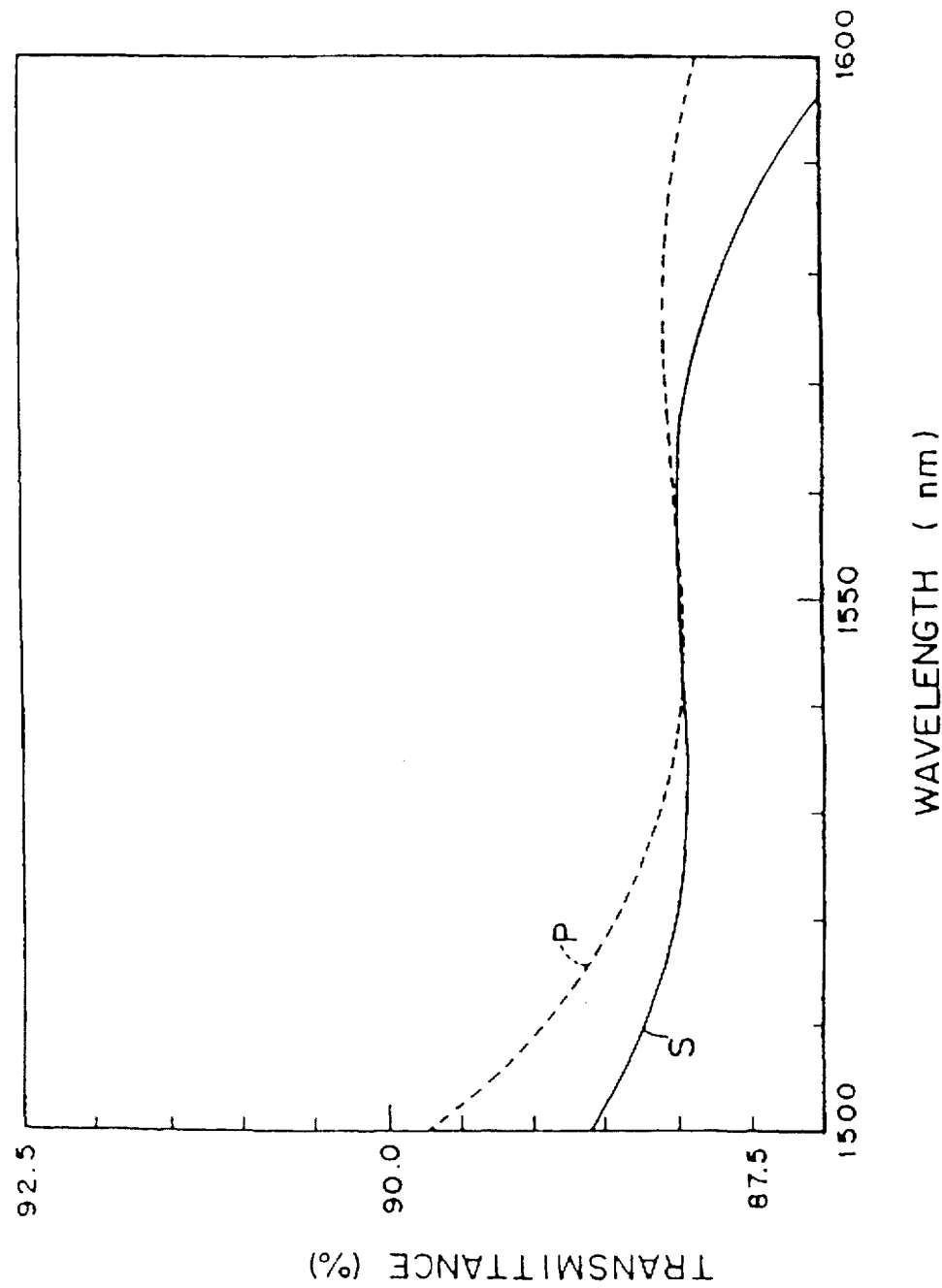
FIG. 2 is a graph showing the characteristic of a beam splitter according to a first preferred embodiment of the present invention.

The glass substrate 1 is formed of BK-7 glass. The high-refractive index layers, i.e., the first layer, the third layer, the fifth layer, the seventh layer, the ninth layer, and the eleventh layer, are formed of $TiO_2$ (titanium dioxide). The low-refractive index layers, i.e., the second layer, the fourth layer, the sixth layer, the eighth layer, the tenth layer, and the twelfth layer, are formed of $SiO_2$ (silicon dioxide). The high-refractive index layers may be formed of $Ta_2O_5$ (ditantalum pentaoxide). FIG. 2 shows the characteristic of the beam splitter configured above when light is incident on the beam splitter at a beam incident angle of 22.5°. In FIG. 2, the vertical axis represents a transmittance (%), and the horizontal axis represents a wavelength (nm), in which the center wavelength is 1550 nm. Further, in FIG. 2, the characteristic of P-polarized light is shown by a symbol P, and the characteristic of S-polarized light is shown by a symbol S. As apparent from FIG. 2, the beam splitter configured above can greatly reduce the polarization dependency of the branching ratio in the wavelength band of 10 nm or more about 1550 nm. The branching ratio (reflected light:transmitted light) of the beam splitter in this preferred embodiment is 1:7. In this manner, the beam splitter with the beam incident angle set to 22.5° and the polarization dependency of the branching ratio reduced can be realized. Accordingly, the optical placement of optical elements in a light amplification module or the like employing this beam splitter can be made simple, thereby allowing easy designing. Furthermore, the characteristic fixed irrespective of a polarized condition of incident light can be realized.

Second Preferred Embodiment

In this preferred embodiment, the optical films 2 are totally five layers of the first layer to the fifth layer, and they are configured by laminating the high-refractive index layer, the medium-refractive index layer, and the low-refractive index layers on the glass substrate 1 as mentioned below. The refractive index of the glass substrate 1 and the refractive index and the optical film thickness of each optical film 2 are set as follows:

|  | Refractive Index | Optical Film Thickness |
|---|---|---|
| Substrate: | 1.51 ± 0.10 | — |
| First Layer: | 1.44 ± 0.10 | 0.05–0.15 |
| Second Layer: | 1.68 ± 0.10 | 0.01–0.10 |
| Third Layer: | 1.44 ± 0.10 | 0.50–0.60 |
| Fourth Layer: | 2.23 ± 0.10 | 0.25–0.35 |
| Fifth Layer: | 1.44 ± 0.10 | 0.25–0.35 |
| External Medium: | 1.00 | — |

Figure 3:
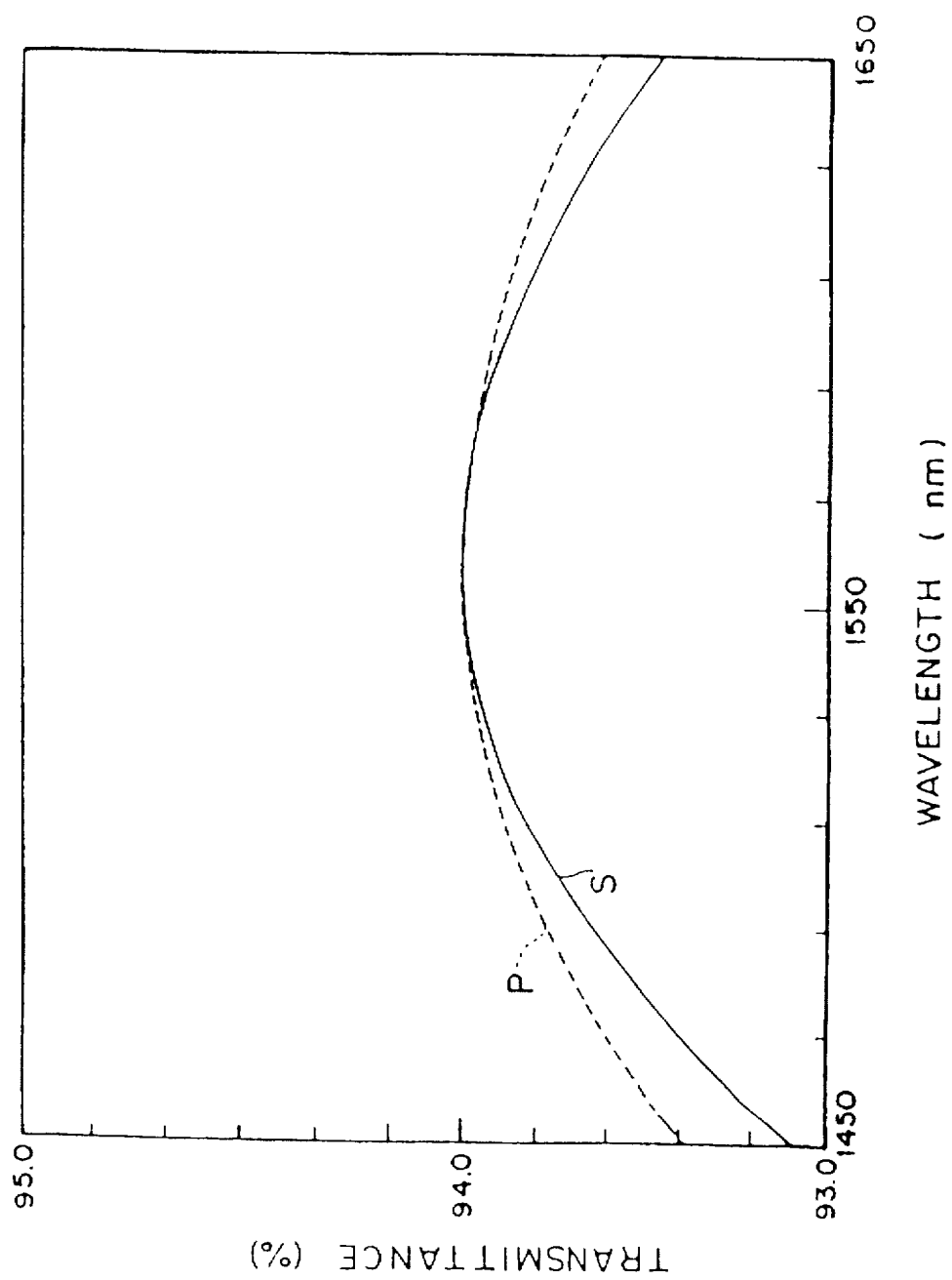
FIG. 3 is a graph showing the characteristic of a beam splitter according to a second preferred embodiment of the present invention.

The glass substrate 1 is formed of BK-7 glass. The high-refractive index layer, i.e., the fourth layer, is formed of $TiO_2$ (titanium dioxide). The medium-refractive index layer, i.e., the second layer, is formed of $Al_2O_3$ (alumina). The low-refractive index layers, i.e., the first layer, the third layer, and the fifth layer, are formed of $SiO_2$ (silicon dioxide). The high-refractive index layer may be formed of $Ta_2O_5$ (ditantalum pentaoxide). FIG. 3 shows the characteristic of the beam splitter configured above when light is incident on the beam splitter at a beam incident angle of 22.5°. In FIG. 3, the vertical axis represents a transmittance (%), and the horizontal axis represents a wavelength (nm), in which the center wavelength is 1550 nm. Further, in FIG. 3, the characteristic of P-polarized light is shown by a symbol P, and the characteristic of S-polarized light is shown by a symbol S. As apparent from FIG. 3, the beam splitter configured above can greatly reduce the polarization dependency of the branching ratio in the wavelength band of 10 nm or more about 1550 nm. The branching ratio (reflected light:transmitted light) of the beam splitter in this preferred embodiment is 1:16. In this manner, the beam splitter with the beam incident angle set to 22.5° and the polarization dependency of the branching ratio reduced can be realized. Accordingly, the optical placement of optical elements in a light amplification module or the like employing this beam splitter can be made simple, thereby allowing easy designing. Furthermore, the characteristic fixed irrespective of a polarized condition of incident light can be realized.

Third Preferred Embodiment

In this preferred embodiment, the optical films 2 are totally three layers of the first layer to the third layer, and they are configured by alternately laminating the high-refractive index layer and the low-refractive index layers on the glass substrate 1 as mentioned below. The refractive index of the glass substrate 1 and the refractive index and the optical film thickness of each optical film 2 are set as follows:

|  | Refractive Index | Optical Film Thickness |
|---|---|---|
| Substrate: | 1.51 ± 0.10 | — |
| First Layer: | 1.46 ± 0.10 | 0.73–0.83 |
| Second Layer: | 2.30 ± 0.10 | 0.13–0.23 |
| Third Layer: | 1.46 ± 0.10 | 0.22–0.32 |
| External Medium: | 1.00 | — |

Figure 4:
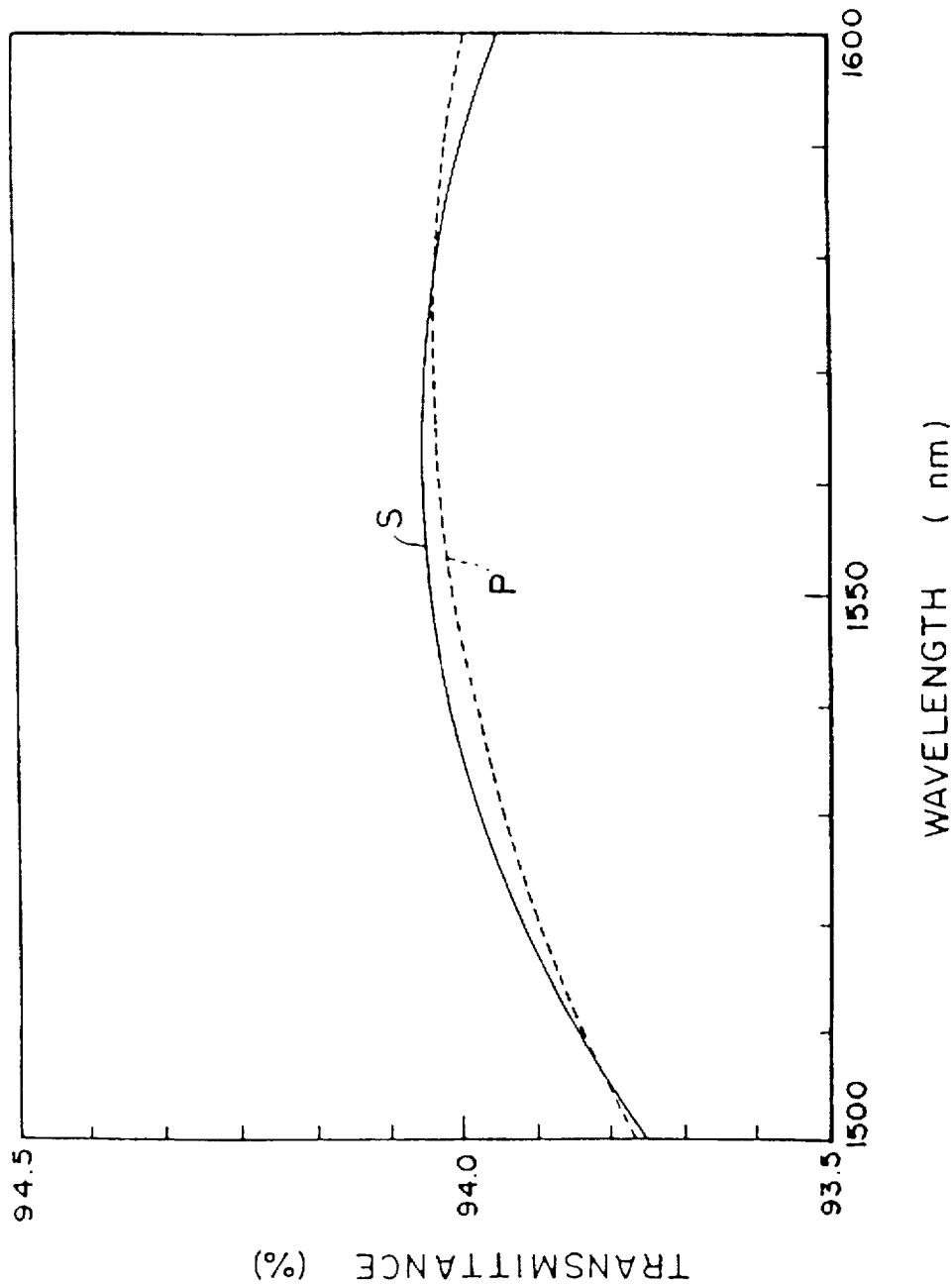
FIG. 4 is a graph showing the characteristic of a beam splitter according to a third preferred embodiment of the present invention.

The glass substrate 1 is formed of BK-7 glass. The high-refractive index layer, i.e., the second layer, is formed of $TiO_2$ (titanium dioxide). The low-refractive index layers, i.e., the first layer and the third layer, are formed of $SiO_2$ (silicon dioxide). The high-refractive index layer may be formed of $Ta_2O_5$ (ditantalum pentaoxide). FIG. 4 shows the characteristic of the beam splitter configured above when light is incident on the beam splitter at a beam incident angle of 22.5°. In FIG. 4, the vertical axis represents a transmittance (%), and the horizontal axis represents a wavelength (nm), in which the center wavelength is 1550 nm. Further, in FIG. 4, the characteristic of P-polarized light is shown by a symbol P, and the characteristic of S-polarized light is shown by a symbol S. As apparent from FIG. 4, the beam splitter configured above can reduce the polarization dependency of the branching ratio in the wavelength band of ±10 nm or more about 1550 nm. The branching ratio (reflected light:transmitted light) of the beam splitter in this preferred embodiment is 1:16. In this manner, the beam splitter with the beam incident angle set to 22.5° and the polarization dependency of the branching ratio reduced can be realized. Accordingly, the optical placement of optical elements in a light amplification module or the like employing this beam splitter can be made simple, thereby allowing easy designing. Furthermore, the characteristic fixed irrespective of a polarized condition of incident light can be realized.

Fourth Preferred Embodiment

In this preferred embodiment, the optical films 2 are totally three layers of the first layer to the third layer, and they are configured by alternately laminating the high-refractive index layer and the low-refractive index layers on the glass substrate 1 as mentioned below. The refractive index of the glass substrate 1 and the refractive index and the optical film thickness of each optical film 2 are set as follows:

|  | Refractive Index | Optical Film Thickness |
|---|---|---|
| Substrate: | 1.51 ± 0.10 | — |
| First Layer: | 1.44 ± 0.10 | 0.58–0.68 |
| Second Layer: | 2.23 ± 0.10 | 0.25–0.35 |
| Third Layer: | 1.44 ± 0.10 | 0.18–0.28 |
| External Medium: | 1.00 | — |

Figure 5:
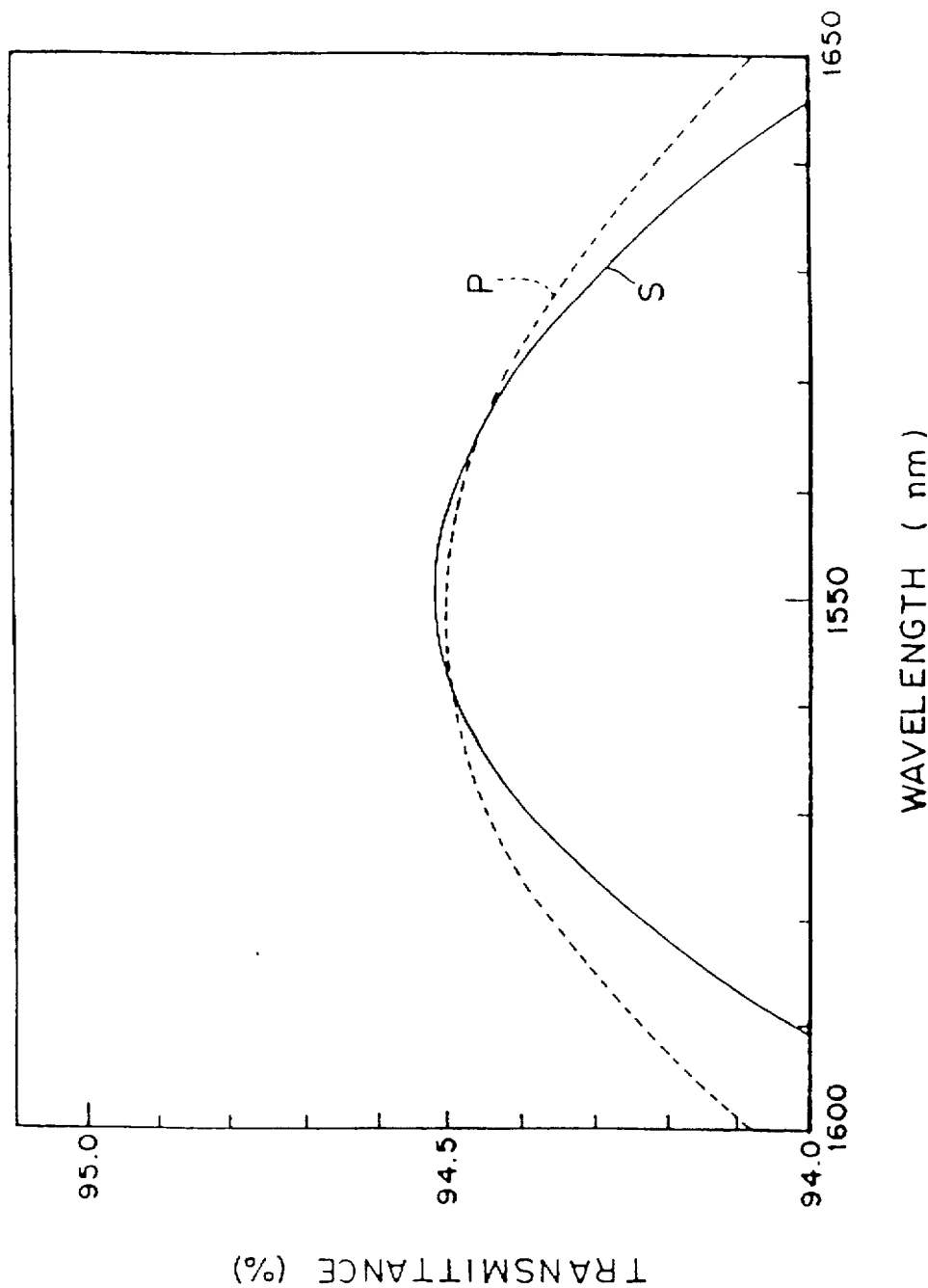
FIG. 5 is a graph showing the characteristic of a beam splitter according to a fourth preferred embodiment of the present invention.

The glass substrate 1 is formed of BK-7 glass. The high-refractive index layer, i.e., the second layer, is formed of $TiO_2$ (titanium dioxide). The low-refractive index layers, i.e., the first layer and the third layer, are formed of $SiO_2$ (silicon dioxide) The high-refractive index layer may be formed of $Ta_2O_5$ (ditantalum pentaoxide). FIG. 5 shows the characteristic of the beam splitter configured above when light is incident on the beam splitter at a beam incident angle of 22.5°. In FIG. 5, the vertical axis represents a transmittance (%), and the horizontal axis represents a wavelength (nm), in which the center wavelength is 1550 nm. Further, in FIG. 5, the characteristic of P-polarized light is shown by a symbol P, and the characteristic of S-polarized light is shown by a symbol S. As apparent from FIG. 5, the beam splitter configured above can reduce the polarization dependency of the branching ratio in the wavelength band of ±10 nm or more about 1550 nm. The branching ratio (reflected light:transmitted light) of the beam splitter in this preferred embodiment is 1:17. In this manner, the beam splitter with the beam incident angle set to 22.5° and the polarization dependency of the branching ratio reduced can be realized. Accordingly, the optical placement of optical elements in a light amplification module or the like employing this beam splitter can be made simple, thereby allowing easy designing. Furthermore, the characteristic fixed irrespective of a polarized condition of incident light can be realized.

Fifth Preferred Embodiment

In this preferred embodiment, the optical films 2 are totally six layers of the first layer to the sixth layer, and they are configured by alternately laminating the high-refractive index layers and the low-refractive index layers on the glass substrate 1 as mentioned below. The refractive index of the glass substrate 1 and the refractive index and the optical film thickness of each optical film 2 are set as follows:

|  | Refractive Index | Optical Film Thickness |
|---|---|---|
| Substrate: | 1.51 ± 0.10 | — |
| First Layer: | 1.44 ± 0.10 | 0.54–0.64 |
| Second Layer: | 2.23 ± 0.10 | 0.49–0.59 |
| Third Layer: | 1.44 ± 0.10 | 0.90–1.30 |
| Fourth Layer: | 2.23 ± 0.10 | 0.21–0.31 |
| Fifth Layer: | 1.44 ± 0.10 | 0.23–0.33 |
| Sixth Layer: | 2.23 ± 0.10 | 0.48–0.58 |
| External Medium: | 1.00 | — |

Figure 6:
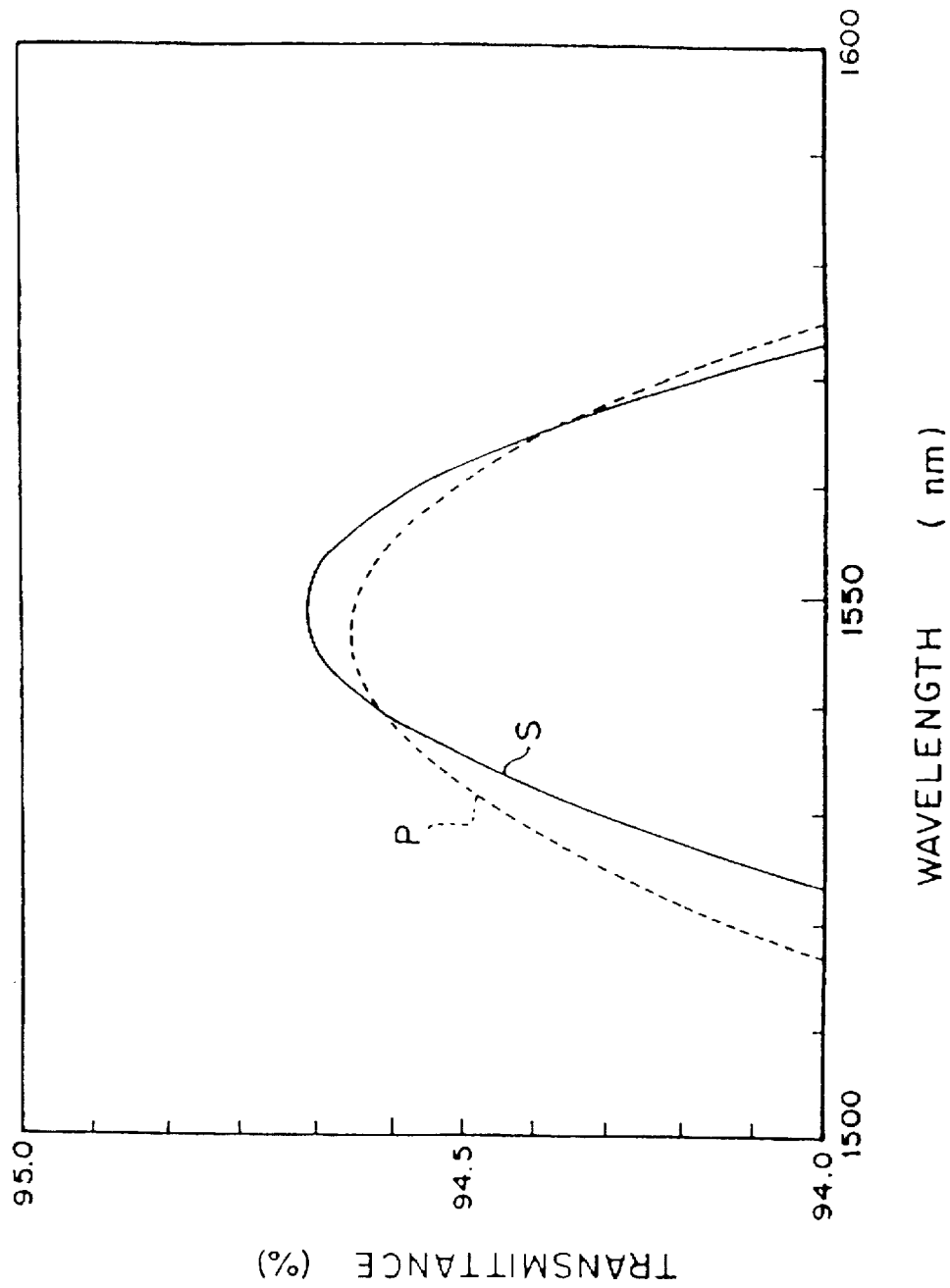
FIG. 6 is a graph showing the characteristic of a beam splitter according to a fifth preferred embodiment of the present invention.

The glass substrate 1 is formed of BK-7 glass. The high-refractive index layers, i.e., the second layer, the fourth layer, and the sixth layer, are formed of $TiO_2$ (titanium dioxide). The low-refractive index layers, i.e., the first layer, the third layer, and the fifth layer, are formed of $SiO_2$ (silicon dioxide). The high-refractive index layers may be formed of $Ta_2O_5$ (ditantalum pentaoxide). FIG. 6 shows the characteristic of the beam splitter configured above when light is incident on the beam splitter at a beam incident angle of 22.5°. In FIG. 6, the vertical axis represents a transmittance (%), and the horizontal axis represents a wavelength (nm), in which the center wavelength is 1550 nm. Further, in FIG. 6, the characteristic of P-polarized light is shown by a symbol P, and the characteristic of S-polarized light is shown by a symbol S. As apparent from FIG. 6, the beam splitter configured above can reduce the polarization dependency of the branching ratio in the wavelength band of 10 nm or more about 1550 nm. The branching ratio (reflected light:transmitted light) of the beam splitter in this preferred embodiment is 1:18. In this manner, the beam splitter with the beam incident angle set to 22.5° and the polarization dependency of the branching ratio reduced can be realized. Accordingly, the optical placement of optical elements in a light amplification module or the like employing this beam splitter can be made simple, thereby allowing easy designing. Furthermore, the characteristic fixed irrespective of a polarized condition of incident light can be realized.

Sixth Preferred Embodiment

In this preferred embodiment, the optical films 2 are totally twelve layers of the first layer to the twelfth layer, and they are configured by alternately laminating the high-refractive index layers and the low-refractive index layers on the glass substrate 1 as mentioned below. The refractive index of the glass substrate 1 and the refractive index and the optical film thickness of each optical film 2 are set as follows:

|  | Refractive Index | Optical Film Thickness |
| --- | --- | --- |
| Substrate: | 1.51 ± 0.10 | — |
| First Layer: | 2.23 ± 0.10 | 0.39–0.50 |
| Second Layer: | 1.44 ± 0.10 | 0.40–0.50 |
| Third Layer: | 2.23 ± 0.10 | 0.27–0.40 |
| Fourth Layer: | 1.44 ± 0.10 | 0.07–0.20 |
| Fifth Layer: | 2.23 ± 0.10 | 0.09–0.20 |
| Sixth Layer: | 1.44 ± 0.10 | 0.10–0.20 |
| Seventh Layer: | 2.23 ± 0.10 | 0.13–0.23 |
| Eighth Layer | 1.44 ± 0.10 | 0.20–0.33 |
| Ninth Layer: | 2.23 ± 0.10 | 0.50–0.65 |
| Tenth Layer: | 1.44 ± 0.10 | 0.30–0.50 |
| Eleventh Layer: | 2.23 ± 0.10 | 2.40–3.50 |
| Twelfth Layer: | 1.44 ± 0.10 | 0.19–0.30 |
| External Medium: | 1.00 | — |

Figure 7:
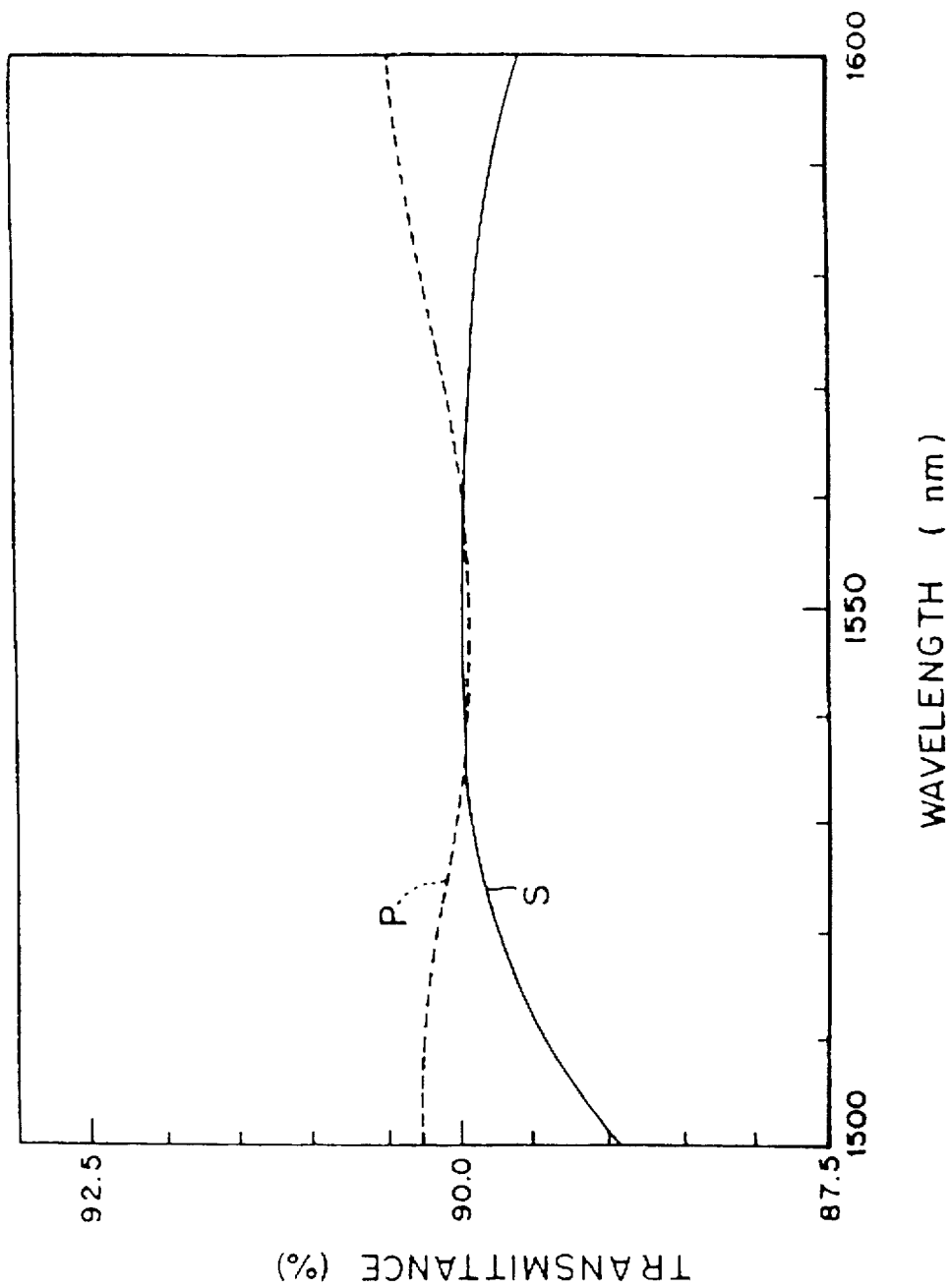
FIG. 7 is a graph showing the characteristic of a beam splitter according to a sixth preferred embodiment of the present invention.

The glass substrate 1 is formed of BK-7 glass. The high-refractive index layers, i.e., the first layer, the third layer, the fifth layer, the seventh layer, the ninth layer, and the eleventh layer, are formed of $TiO_2$ (titanium dioxide). The low-refractive index layers, i.e., the second layer, the fourth layer, the sixth layer, the eighth layer, the tenth layer, and the twelfth layer, are formed of $SiO_2$ (silicon dioxide). The high-refractive index layers may be formed of $Ta_2O_5$ (ditantalum pentaoxide). FIG. 7 shows the characteristic of the beam splitter configured above when light is incident on the beam splitter at a beam incident angle of 22.5°. In FIG. 7, the vertical axis represents a transmittance (%), and the horizontal axis represents a wavelength (nm), in which the center wavelength is 1550 nm. Further, in FIG. 7, the characteristic of P-polarized light is shown by a symbol P, and the characteristic of S-polarized light is shown by a symbol S. As apparent from FIG. 7, the beam splitter configured above can greatly reduce the polarization dependency of the branching ratio in the wavelength band of 10 nm or more about 1550 nm. The branching ratio (reflected light:transmitted light) of the beam splitter in this preferred embodiment is 1:9. In this manner, the beam splitter with the beam incident angle set to 22.5° and the polarization dependency of the branching ratio reduced can be realized. Accordingly, the optical placement of optical elements in a light amplification module or the like employing this beam splitter can be made simple, thereby allowing easy designing. Furthermore, the characteristic fixed irrespective of a polarized condition of incident light can be realized.

What is claimed is:

1. A beam splitter formed by laminating a plurality of optical films on a substrate, wherein:

said substrate comprises a glass substrate having a refractive index of 1.51±0.10; and said optical films comprise:

a first layer formed on said glass substrate, said first layer having a refractive index of 1.44±0.10 and an optical film thickness of 0.05–0.15;

a second layer formed on said first layer, said second layer having a refractive index of 1.68±0.10 and an optical film thickness of 0.01–0.10;

a third layer formed on said second layer, said third layer having a refractive index of 1.44±0.10 and an optical film thickness of 0.50–0.60;

a fourth layer formed on said third layer, said fourth layer having a refractive index of 2.23±0.10 and an optical film thickness of 0.25–0.35; and a fifth layer formed on said fourth layer, said fifth layer having a refractive index of 1.44±0.10 and an optical film thickness of 0.25–0.35.

2. A beam splitter according to claim 1, wherein:

said first layer, said third layer, and said fifth layer are deposited films formed of $SiO_2$;

said second layer is a deposited film formed of $Al_2O_3$; and said fourth layer is a deposited film formed of $TiO_2$ or $Ta_2O_5$.

* * * * *